(12) United States Patent
Chen

(10) Patent No.: US 9,250,412 B2
(45) Date of Patent: Feb. 2, 2016

(54) LENS DEVICE

(71) Applicants:Sintai Optical (Shenzhen) Co., Ltd., Gong Ming Town (CN); Asia Optical International Ltd., Road Town (GB)

(72) Inventor: Tsung-Tse Chen, Taichung (TW)

(73) Assignees: Sintai Optical (Shenzhen) Co., Ltd., Gong Ming Town (CN); Asia Optical International, Ltd., Road Town (VG)

( * ) Notice: Subject to any disclaimer, the term of this patent is extended or adjusted under 35 U.S.C. 154(b) by 245 days.

(21) Appl. No.: 13/866,517

(22) Filed: Apr. 19, 2013

(65) Prior Publication Data
US 2013/0286492 A1  Oct. 31, 2013

(30) Foreign Application Priority Data
Apr. 25, 2012  (TW) .............................. 101114741 A

(51) Int. Cl.
*G02B 15/14* (2006.01)
*G02B 7/02* (2006.01)

(52) U.S. Cl.
CPC ................ *G02B 7/022* (2013.01); *G02B 15/14* (2013.01)

(58) Field of Classification Search
CPC ............ G02B 7/10; G02B 7/04; G02B 15/14; G02B 7/022; G02B 7/023; G02B 7/14; G02B 7/003; G03B 2205/0046; G03B 17/14
See application file for complete search history.

(56) References Cited

U.S. PATENT DOCUMENTS

2011/0102921 A1 *  5/2011  Sato .............................. 359/823

* cited by examiner

*Primary Examiner* — Alicia M Harrington
(74) *Attorney, Agent, or Firm* — Trop, Pruner & Hu, P.C.

(57) ABSTRACT

A lens device includes a first barrel surrounding an optical axis, a first frame coupled rotatably to the first barrel and surrounding a first axis, and an adjusting unit. The adjusting unit has an adjusting groove formed in one of the first barrel and the first frame, and having adjusting groove segments, one of which extends spirally. The adjusting unit further has adjusting blocks formed on the other one of the first barrel and the first frame and engaging respectively and slidably the adjusting grooves. The first frame is rotatable relative to the first barrel to adjust the first axis relative to the optical axis.

9 Claims, 7 Drawing Sheets

LENS DEVICE

CROSS-REFERENCE TO RELATED APPLICATION

This application claims priority of Taiwanese Application No. 101114741, filed on Apr. 25, 2012.

BACKGROUND OF THE INVENTION

1. Field of the Invention

The invention relates to a lens device, more particularly to a lens device that has an alignment correction unit for adjusting an axis of a lens module.

2. Description of the Related Art

A lens device generally has a lens adjustable for correcting the position thereof so as to achieve optimum optical characteristics for the lens device. U.S. Pat. No. 7,139,138 discloses a conventional lens device including a lens barrel and a lens mounted in the lens barrel. The lens is movable with respect to an optical axis via a guiding unit disposed between the lens barrel and the lens, or a positioning unit sleeved on the lens so as to adjust a lens axis of the lens relative to the optical axis. However, the lens is only movable in transverse directions with respect to the optical axis, so that the adjustment between the lens axis and the optical axis may not be easily conducted.

U.S. Pat. No. 7,187,508 discloses another conventional lens device that includes an alignment correction unit for adjusting a lens axis of a lens module. The alignment correction unit includes a mounting ring, a module barrel mounted with the lens module, an elastically deformable component clamped between the mounting ring and the module barrel, and four screw fasteners extending through the module barrel into the mounting ring for locking the module barrel to the mounting ring. During the adjustment process, the depths of the threaded engagement of the screw fasteners with the mounting ring can be independently adjusted such that the module barrel can be tilted relative to the mounting ring, and that the lens axis of the lens module can be precisely adjusted. However, the structure of this conventional lens device is relatively complicated, and the operation of the alignment correction unit is relatively inconvenient.

SUMMARY OF THE INVENTION

Therefore, the object of the present invention is to provide a lens device that may alleviate the abovementioned drawbacks of the prior art.

Accordingly, a lens device of the present invention comprises a first barrel, a first frame and an adjusting unit. The first barrel has an inner surrounding surface that surrounds an optical axis. The first frame is coupled rotatably to the first barrel and has an outer surrounding surface that surrounds a first axis. The adjusting unit has an adjusting groove that is formed in one of the inner surrounding surface of the first barrel and the outer surrounding surface of the first frame, and that has a plurality of angularly spaced-apart adjusting groove segments. One of the adjusting groove segments extends spirally. The adjusting unit further has a plurality of adjusting blocks that are formed on the other one of the inner surrounding surface of the first barrel and the outer surrounding surface of the first frame and that engage respectively and slidably the adjusting grooves. The first frame is rotatable relative to the first barrel to adjust the first axis relative to the optical axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
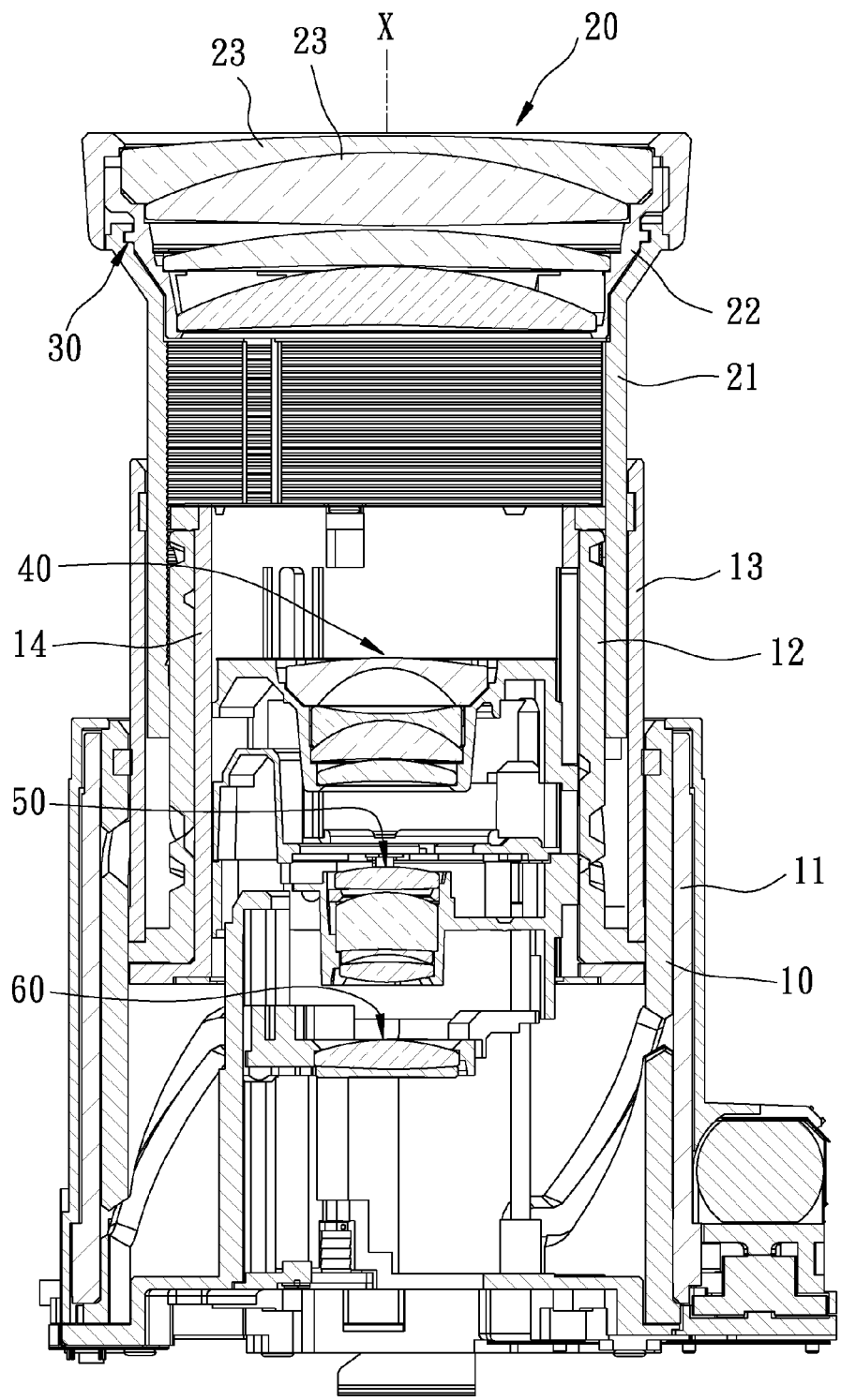
FIG. 1 is a sectional view of a preferred embodiment of a lens device according to the invention.
Figure 2:
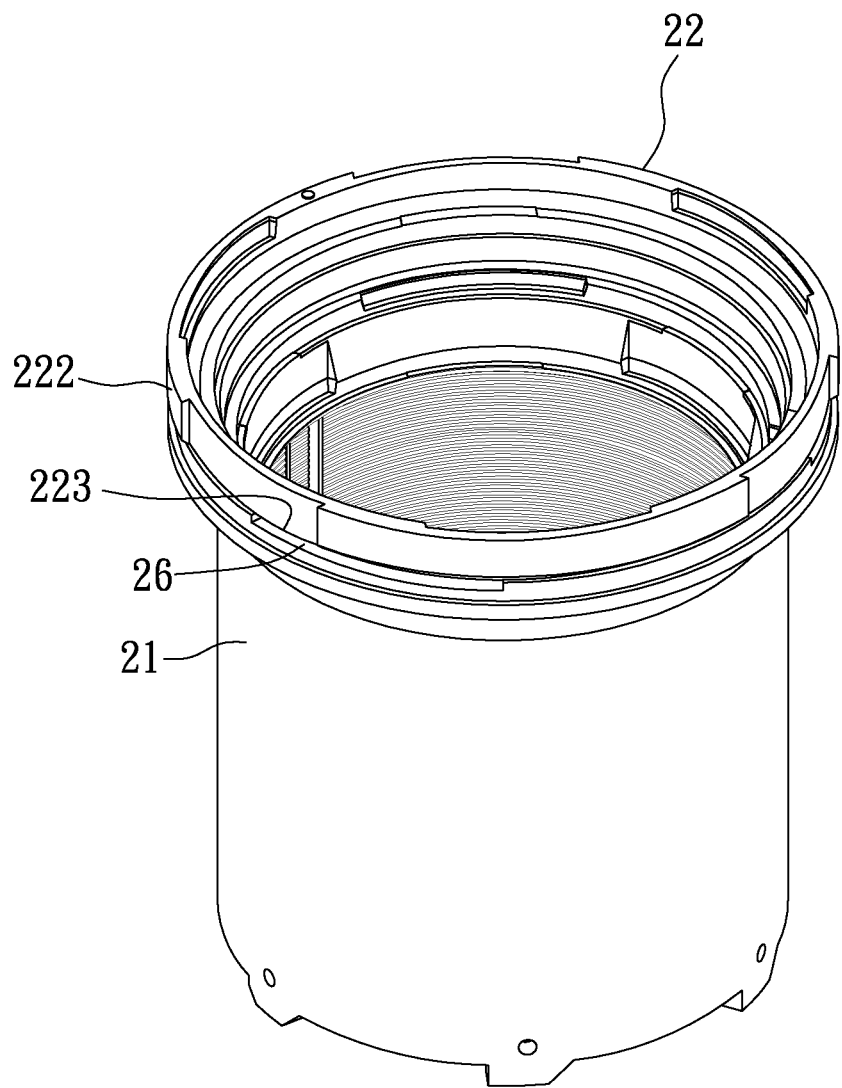
FIG. 2 is an assembled perspective view of a first barrel and a first frame of the preferred embodiment.
Figure 3:
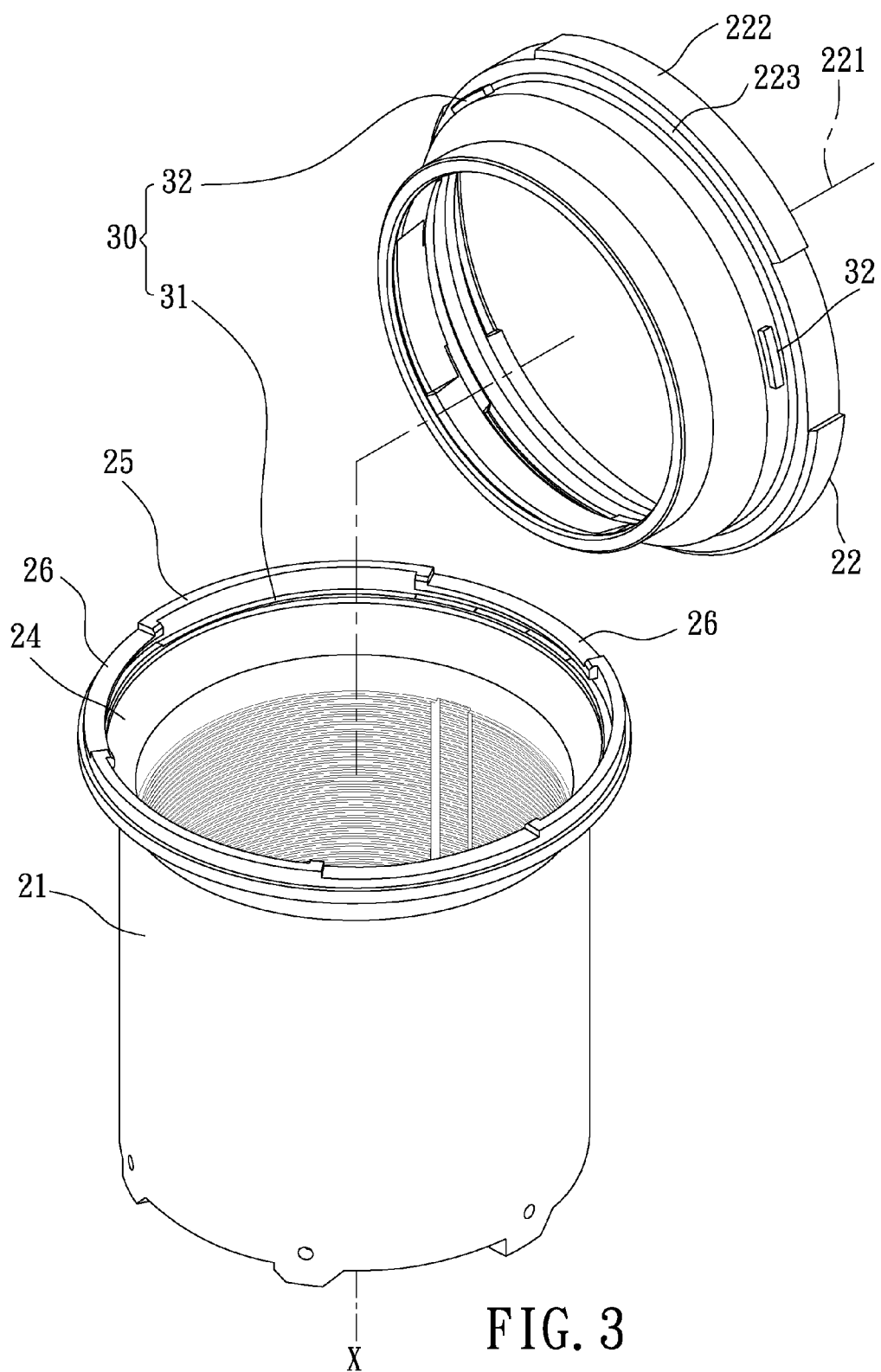
FIG. 3 is an exploded perspective view of the first barrel and the first frame of the preferred embodiment.

As shown in FIGS. 1 to 3, the preferred embodiment of a lens device according to the present invention comprises a base barrel 10, a rotatable barrel 11, a cam barrel 12, a first movable barrel 13, a second movable barrel 14, a first lens module 20, an adjusting unit 30, a second lens module 40, a third lens module 50 and a focus lens module 60.

The base barrel 10 surrounds an optical axis (X). The rotatable barrel 11 surrounds rotatably the base barrel 10. The cam barrel 12 is mounted rotatably in the base barrel 10. The first movable barrel 13 is coupled to the base barrel 10 and the cam barrel 12, is movable relative to the base barrel 10 along the optical axis (X), and is co-movable with the cam barrel 12 along the optical axis (X). The second movable barrel 14 is coupled to the base barrel 10 and the cam barrel 12, is movable relative to the base barrel 10 along the optical axis (X), and is co-movable with the cam barrel 12 along the optical axis (X).

The first lens module 20, the second lens module 40, the third lens module 50 and the focus lens module 60 are disposed on the optical axis (X) and are arranged from front to rear in sequence and in the given order.

The first lens module 20 is mounted in the first movable barrel 13. The cam barrel 12 is movable to drive movement of the first lens module 20 relative to the first movable barrel 13 along the optical axis (X). The second and third lens modules 40, 50 are mounted in the second movable barrel 14. The cam barrel 12 is movable to drive movement of the second and third lens modules 40, 50 relative to the second movable barrel 14 along the optical axis (X). Since the way the first, second, third and focus lens modules 20, 40, 50, 60 are moved is known in the art, further details of the same are omitted herein for the sake of brevity.

The first lens module 20 includes a first barrel 21, a first frame 22 and a plurality of first lenses 23. The first barrel 21 has an inner surrounding surface 24 that surrounds the optical axis (X), and a rear contact surface 25 that is disposed at a front end of the first barrel 21, that is connected to the inner surrounding surface 24 and that is formed with a plurality of angularly spaced-apart adhesive grooves 26.

The first frame 22 is coupled rotatably to the first barrel 21, and has an outer surrounding surface 222 that surrounds a first axis 221, and a front contact surface 223 that is connected transversely to the outer surrounding surface 222, and that confronts the rear contact surface 25 of the first barrel 21.

Figure 4:
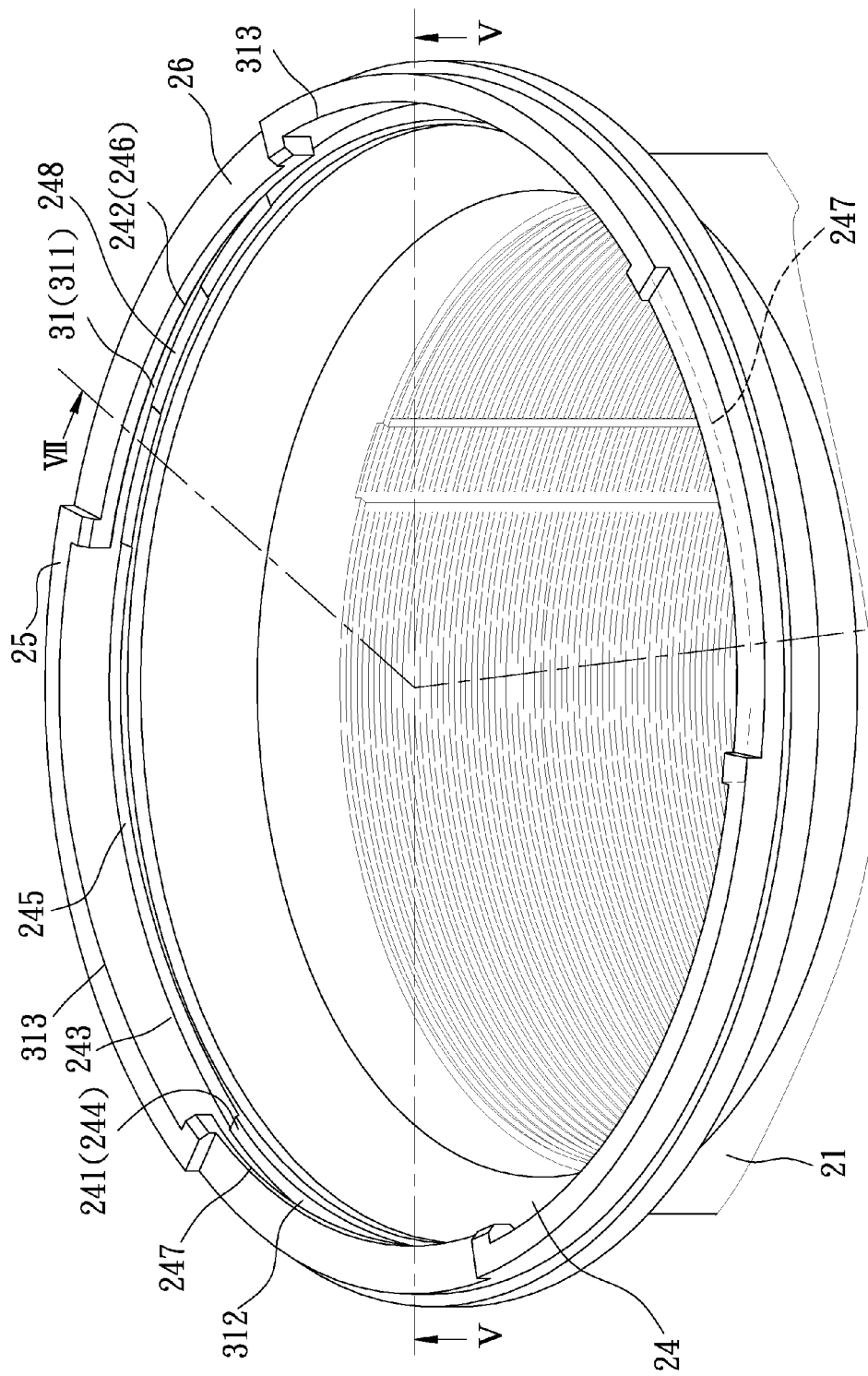
FIG. 4 is a fragmentary perspective view of the first barrel of the preferred embodiment.
Figure 5:
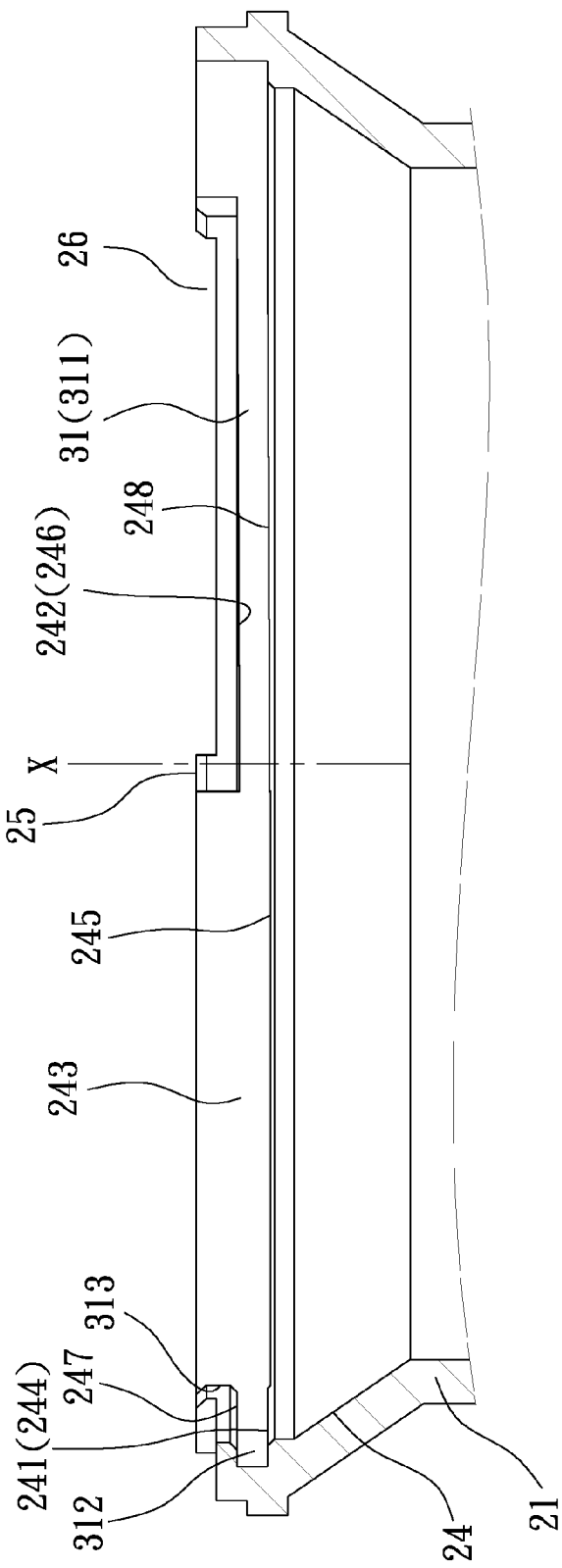
FIG. 5 is a fragmentary sectional view taken along line V-V in FIG. 4.

Referring to FIGS. 3 to 5, in this embodiment, the adjusting unit 30 has an adjusting groove 31 that is formed in the inner surrounding surface 24 of the first barrel 21, and that has a plurality of angularly spaced-apart adjusting groove segments. One of the adjusting groove segments is configured to extend spirally and is defined as a main adjusting groove segment 311. The remaining of the adjusting groove segments define an imaginary circular surface which is normal to the optical axis (X). Each of the remaining of the adjusting groove segments is defined as an auxiliary adjusting groove segment 312. The adjusting unit 30 further has a plurality of adjusting blocks 32 that are formed on the outer surrounding surface 222 of the first frame 22 behind the front contact surface 223 of the first frame 22, and that engage respectively and slidably the main and auxiliary adjusting groove segments 311, 312.

The adjusting groove 31 is defined cooperatively by an annular rear surface section 241, a front surface section 242 spaced apart from the rear surface section 241 along the optical axis (X) and disposed between the rear surface section 241 and a front end of the first barrel 21, and a side surface section 243 interconnecting the rear and front surface sections 241, 242. The rear surface section 241 has a connecting surface segment 244 and a spirally-extending adjusting surface segment 245 interconnecting opposite ends of the connecting surface segment 244. In this embodiment, the adjusting surface segment 245 is disposed behind the imaginary circular surface that is defined by the auxiliary adjusting groove segment 312.

The adjusting groove 31 further has a plurality of angularly spaced-apart openings 313 extending through the front surface section 242 and the front end of the first barrel 21, and dividing the front surface section 242 into a plurality of surface segments that correspond in position to the adjusting groove segments 311, 312, respectively. In this embodiment, as shown in FIG. 5, one of the surface segments of the front surface section 242 extends spirally and is defined as an adjusting surface segment 246, and a portion of the adjusting surface segment 245 is configured to correspond in position to the adjusting surface segment 246 and cooperates with the adjusting surface segment 246 to define the main adjusting groove segment 311. A remaining portion of the adjusting surface segment 245 is configured to correspond in position to one of the openings 313 that is adjacent to the main adjusting groove segment 311. The rest of the surface segments of the front surface section 242 define another imaginary circular surface which is normal to the optical axis (X) and each is defined as a connecting surface segment 247. The adjusting surface segment 246 is disposed behind the imaginary circular surface that is defined by the connecting surface segments 247. The portion of the adjusting surface segment 245 corresponding in position to the adjusting surface segment 246 is a stepped surface segment 248.

Figure 6:
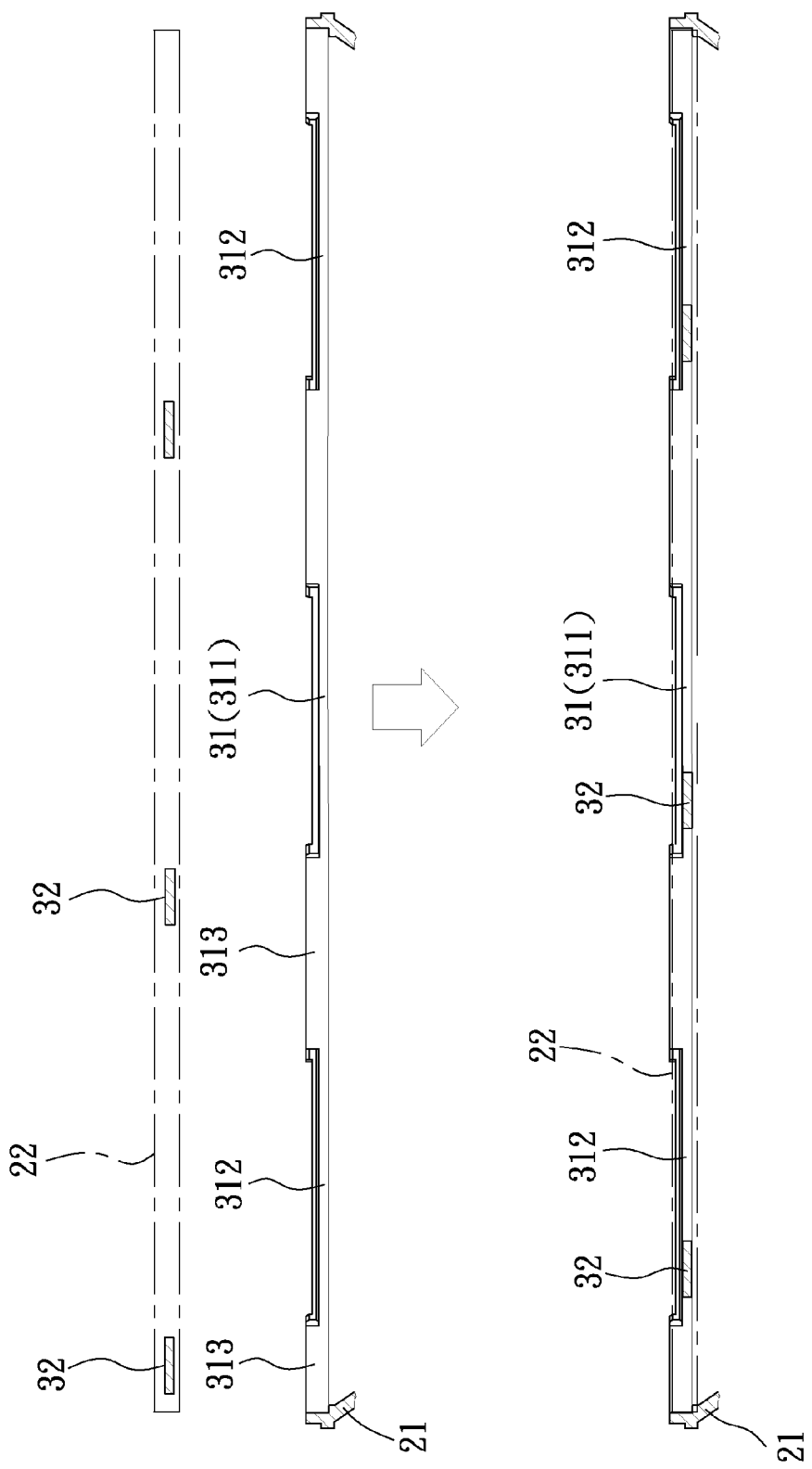
FIG. 6 is a fragmentary schematic sectional view illustrating how the first frame is coupled to the first barrel.
Figure 7:
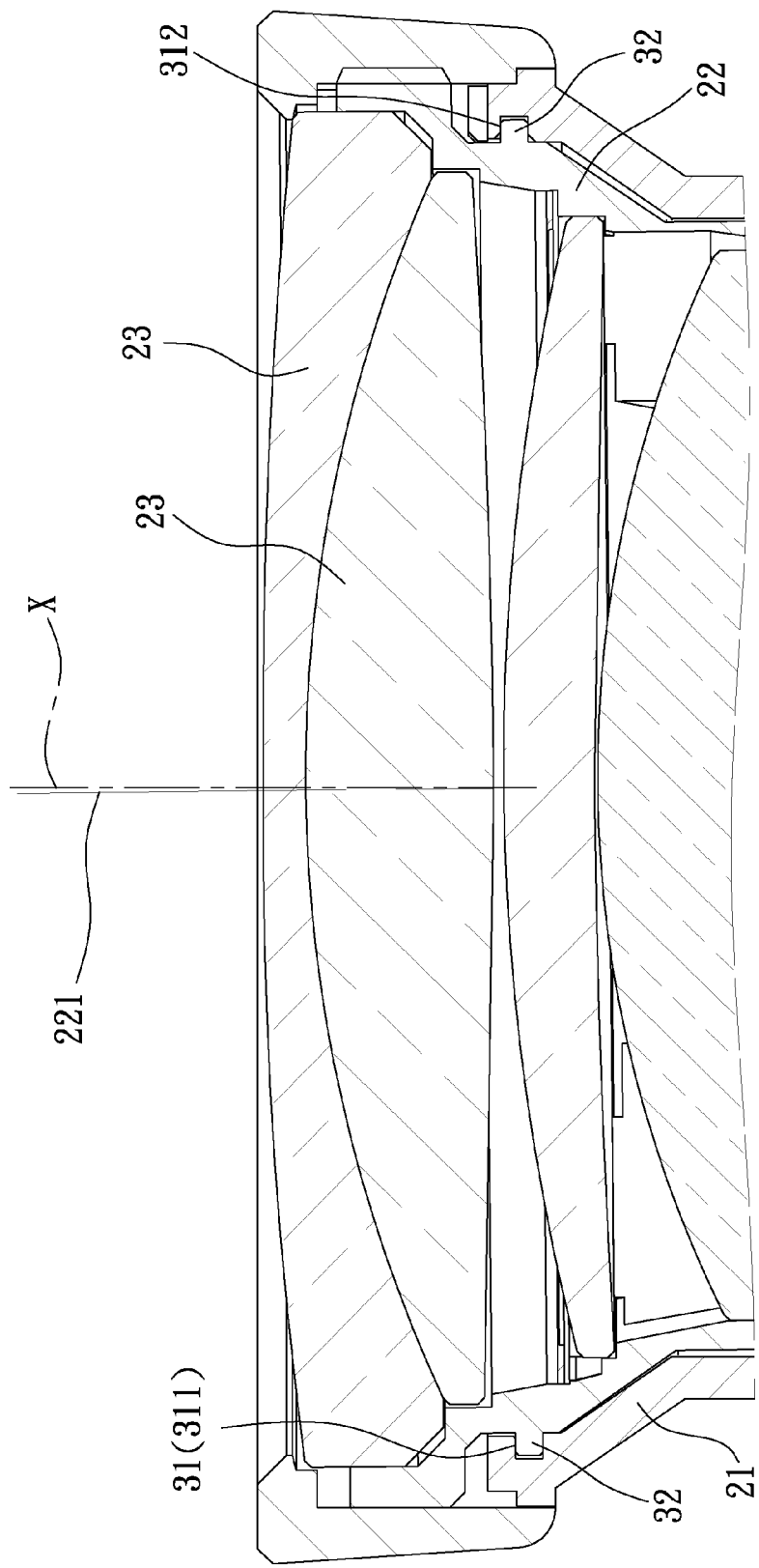
FIG. 7 is an enlarged fragmentary sectional view taken along line VII-VII in FIG. 4.

As shown in FIGS. 6 and 7, to conduct the adjustment process, the first frame 22 is moved relative to the first barrel 21 to pass the adjusting blocks 32 respectively through the openings 313 and into the adjusting groove 31. Afterward, the first frame 22 is rotated relative to the first barrel 21 so that the adjusting blocks 32 are moved into the main and the auxiliary adjusting groove segments 311, 312, respectively. As a result, one of the adjusting blocks 32 that engages the main adjusting groove segment 311 is moved to slide spirally due to the spirally-extending stepped configuration of the main adjusting groove segment 311 during further rotation of the first frame 22, thereby tilting the first frame 22 and the first lenses 23 relative to the first barrel 21. Therefore, the first axis 221 can be adjusted to tilt relative to the optical axis (X) (see FIG. 7) so as to achieve optimum optical characteristics for the lens device of this invention.

It should be noted that, due to dimensional tolerances of the first barrel 21, the first frame 22 and the first lenses 23, different adjustment results may be made when the first frame 22 is rotated for a circle relative to the first barrel 21 to engage different adjusting blocks 32 with the main adjusting groove segment 311. After the adjustment of the first axis 221, adhesive is injected into the adhesive grooves 26 to lock the first frame 22 to the first barrel 21.

To sum up, the structure of the adjusting unit 30 is relatively simple, and the adjustment of the first axis 221 can be easily and precisely conducted by rotating the first frame 22 relative to the first barrel 21. Moreover, during the rotation of the first frame 22 for tilting the first axis 221, the orientation of the first axis 221 is also changed, so that the lens device of this invention has a greater adjustment flexibility than the prior art.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens device comprising:
a first barrel having an inner surrounding surface that surrounds an optical axis;
a first frame coupled rotatably to said first barrel and having an outer surrounding surface that surrounds a first axis; and
an adjusting unit having
an adjusting groove that is formed in said inner surrounding surface of said first barrel, and that has a plurality of angularly spaced-apart adjusting groove segments, one of said adjusting groove segments extending spirally, and
a plurality of adjusting blocks that are formed on said outer surrounding surface of said first frame and that engage respectively and slidably said adjusting grooves;
wherein said first frame is rotatable relative to said first barrel to adjust the first axis relative to the optical axis.

2. The lens device as claimed in claim 1, wherein:
said adjusting groove is defined cooperatively by a rear surface section, a front surface section spaced apart from said rear surface section along the optical axis and disposed between said rear surface section and a front end of said first barrel, and a side surface section interconnecting said rear and front surface sections;
said adjusting groove further has a plurality of angularly spaced-apart openings extending through said front surface section and said front end of said first barrel, and dividing said front surface section into a plurality of surface segments that correspond in position to said adjusting groove segments, respectively.

3. The lens device as claimed in claim 2, wherein:
said rear surface section has a connecting surface segment and a adjusting surface segment extending at least partially spirally and interconnecting opposite ends of said connecting surface segment; and
one of said surface segments of said front surface section extends spirally and cooperates with said adjusting surface segment of said rear surface section to define the spirally-extending one of said adjusting groove segments.

4. The lens device as claimed in claim 3, wherein said adjusting surface segment of said rear surface section is a stepped surface segment.

5. The lens device as claimed in claim 3, wherein:
a portion of said adjusting surface segment of said rear surface section corresponds in position to said one of said surface segments of said front surface section and cooperates with said one of said surface segments of said front surface section to define said spirally-extending one of said adjusting groove segments; and
a remaining portion of said adjusting surface segment of said rear surface section corresponds in position to one of said openings that is adjacent to said spirally-extending one of said adjusting groove segments.

6. The lens device as claimed in claim 1, wherein:
said first barrel further has a rear contact surface that is disposed at a front end of said first barrel, that is connected to said inner surrounding surface and that is formed with a plurality of angularly spaced-apart adhesive grooves; and
said first frame further has a front contact surface that is connected to said outer surrounding surface, that is disposed in front of said adjusting blocks and that confronts said rear contact surface of said first barrel.

7. The lens device as claimed in claim 1, further comprising a plurality of first lenses mounted in said first barrel, and cooperating with said first barrel and said first frame to form a first lens module.

8. The lens device as claimed in claim 7, further comprising a second lens module, a third lens module, and a focus lens module, said first, second, third and focus lens modules being disposed on the optical axis and arranged from front to rear in sequence.

9. The lens device as claimed in claim 8, further comprising:
a base barrel;
a rotatable barrel surrounding rotatably said base barrel;
a cam barrel mounted rotatably in said base barrel;
a first movable barrel coupled to said base barrel and said cam barrel, movable relative to said base barrel along the optical axis, and co-movable with said cam barrel along the optical axis; and
a second movable barrel coupled to said base barrel and said cam barrel, movable relative to said base barrel along the optical axis, and co-movable with said cam barrel along the optical axis;
wherein said first lens module is mounted in said first movable barrel, said cam barrel being movable to drive movement of said first lens module relative to said first movable barrel along the optical axis; and
wherein said second and third lens modules are mounted in said second movable barrel, said cam barrel being movable to drive movements of said second and third lens modules relative to said second movable barrel along the optical axis.

* * * * *